(12) United States Patent
Premerlani et al.

(10) Patent No.: US 10,372,569 B2
(45) Date of Patent: Aug. 6, 2019

(54) METHODS AND SYSTEM FOR DETECTING FALSE DATA INJECTION ATTACKS

(71) Applicant: General Electric Company, Schenectady, NY (US)

(72) Inventors: William James Premerlani, Scotia, NY (US); Chaitanya Ashok Baone, Glenville, NY (US); Yan Pan, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 351 days.

(21) Appl. No.: 15/218,822

(22) Filed: Jul. 25, 2016

(65) Prior Publication Data
US 2018/0024900 A1    Jan. 25, 2018

(51) Int. Cl.
*G06F 11/22*    (2006.01)
*G06F 11/32*    (2006.01)
(Continued)

(52) U.S. Cl.
CPC ...... *G06F 11/2221* (2013.01); *G06F 11/2215* (2013.01); *G06F 11/327* (2013.01); *G06F 11/3672* (2013.01); *G06F 21/55* (2013.01); *G06F 21/554* (2013.01); *H04L 63/1425* (2013.01); *H04L 63/1466* (2013.01); *H04L 67/12* (2013.01); *G05B 23/0227* (2013.01); *H04L 63/1416* (2013.01); *Y04S 40/18* (2018.05); *Y04S 40/24* (2013.01)

(58) Field of Classification Search
CPC .............. G01R 31/02; G06F 17/3069; G06F 2212/454; H02J 3/38; H02S 50/00; H04L 43/065
See application file for complete search history.

(56) References Cited

U.S. PATENT DOCUMENTS 5,206,595 A  *  4/1993  Wiggins .............. G01R 31/08
                                                     324/532
5,809,045 A       9/1998  Adamiak et al.
                        (Continued)

FOREIGN PATENT DOCUMENTS

EP        2 645 516 A1    10/2013
WO    2015089448 A1     6/2015

OTHER PUBLICATIONS

Tiwari et al. (2014). Safety Envelope for Security. HiCoNS'14, Apr. 15-17, Berlin, Germany. Retrieved Oct. 1, 2018 from http://delivery.acm.org (Year: 2014).*

(Continued)

*Primary Examiner* — Brian F Shaw
(74) *Attorney, Agent, or Firm* — Buckley, Maschoff & Talwalkar LLC

(57) ABSTRACT

A system for detecting false data injection attacks includes one or more sensors configured to each monitor a component and generate signals representing measurement data associated with the component. The system also includes a fault detection computer device configured to: receive the signals representing measurement data from the one or more sensors, receive a fault indication of a fault associated with the component, generate a profile for the component based on the measurement data, and determine an accuracy of the fault indication based upon the generated profile.

18 Claims, 7 Drawing Sheets

(51) Int. Cl.
*G06F 11/36* (2006.01)
*G06F 21/55* (2013.01)
*H04L 29/06* (2006.01)
*H04L 29/08* (2006.01)
*G05B 23/02* (2006.01)

(56) References Cited

U.S. PATENT DOCUMENTS

| | | | |
|---|---|---|---|
| 8,712,596 B2 | 4/2014 | Scott | |
| 8,893,216 B2 | 11/2014 | Yadav et al. | |
| 9,177,139 B2 | 11/2015 | Hull | |
| 10,038,401 B2* | 7/2018 | Khan | H02S 50/15 |
| 2003/0128133 A1* | 7/2003 | Thomas | G01R 15/186 |
| | | | 340/854.9 |
| 2011/0282508 A1 | 11/2011 | Goutard et al. | |
| 2012/0284790 A1 | 11/2012 | Bhargava | |
| 2015/0015301 A1* | 1/2015 | Laaksonen | H02J 3/38 |
| | | | 324/764.01 |

OTHER PUBLICATIONS

Rahman, M.S. et al.; "Distributed Multi-agent Scheme to Enhance Cyber Security of Smart Power Grids"; 2015 IEEE PES General Meeting, Denver, Colorado; 5 pp.

Sozaki, Yasunori et al.; "Detection of Cyber Attacks Against Voltage Control in Distribution Power Grids with PVs"; IEEE Transactions on Smart Grid; vol. PP, Issue 99, May, 26, 2015; 12 pp.

Sozaki, Yasunori et al.; "On Detection of Cyber Attcks Against Voltage Control in Distribution Power Grids"; 2014 IEEE International Conference on Smart Grid Communications, Venice, Italy; pp. 842-847.

Extended European Search Report and Opinion issued in connection with corresponding EP Application No. 17176835.1 dated Nov. 20, 2017.

\* cited by examiner

… (1)

METHODS AND SYSTEM FOR DETECTING FALSE DATA INJECTION ATTACKS

BACKGROUND

The field of the invention relates generally to detecting false data injection attacks, and more specifically, to methods and a system for detecting false data injection attacks on a power grid substation.

Cybersecurity is a critical issue for reliable utility management. As the utilities move more towards smart grid systems, the potential for cyber-attacks increases. Smart grid systems provide many opportunities for communication to be transmitted between devices. Each device increases the opportunity for a vulnerability to be introduced that allows a malicious actor to introduce an attack into the smart grid system.

One example cyber-attack is a false data injection attack, where the attack introduces false data into a system, such as a smart grid system or other computer-based system. Many times this attack is used to cause the system to take actions that the system typically would not perform during normal operation. For example, an attack may introduce false sensor data configured to induce a substation circuit breaker to trip. Specifically, while the voltage and current may be within normal operating parameters, the false data may induce the system to determine that the voltage and/or amperage exceed safe operating parameters and thereby induce the system to de-energize a portion of the electric grid to prevent or alleviate fault conditions. Alternatively, the false data may indicate that everything is within safe operating parameters when conditions actually indicate that a part of the system should be isolated.

BRIEF DESCRIPTION

In one aspect, a system for detecting false data injection attacks is provided. The system includes one or more sensors configured to each monitor a component and generate signals representing measurement data associated with the component. The system also includes a fault detection computer device comprising a processor and a memory coupled to the processor. The fault detection computer device is in communication with the one or more sensors. The fault detection computer device is configured to receive the signals representing measurement data from the one or more sensors, receive a fault indication of a fault associated with the component, generate a profile for the component based on the measurement data, and determine an accuracy of the fault indication based upon the generated profile.

In a further aspect, a computer-based method for detecting false data injection attacks is provided. The method is implemented using a fault detection computer device including at least one processor in communication with a memory. The method includes receiving signals representing measurement data from the one or more sensors that each monitor a component and generate signals representing measurement data, receiving a fault indication of a fault associated with the component, generating a profile for the component based on the measurement data, and determining an accuracy of the fault indication based upon the generated profile.

In another aspect, a computer-readable storage device having processor-executable instructions embodied thereon for detecting false data injection attacks is provided. When executed by a fault detection computer device communicatively coupled to a memory, the processor-executable instructions cause the fault detection computer device to receive signals representing measurement data from the one or more sensors that each monitor a component and generate signals representing measurement data, receive a fault indication of a fault associated with the component, generate a profile for the component based on the measurement data, and determine an accuracy of the fault indication based upon the generated profile.

DRAWINGS

These and other features, aspects, and advantages of the present disclosure will become better understood when the following detailed description is read with reference to the accompanying drawings in which like characters represent like parts throughout the drawings, wherein.

Figure 1:
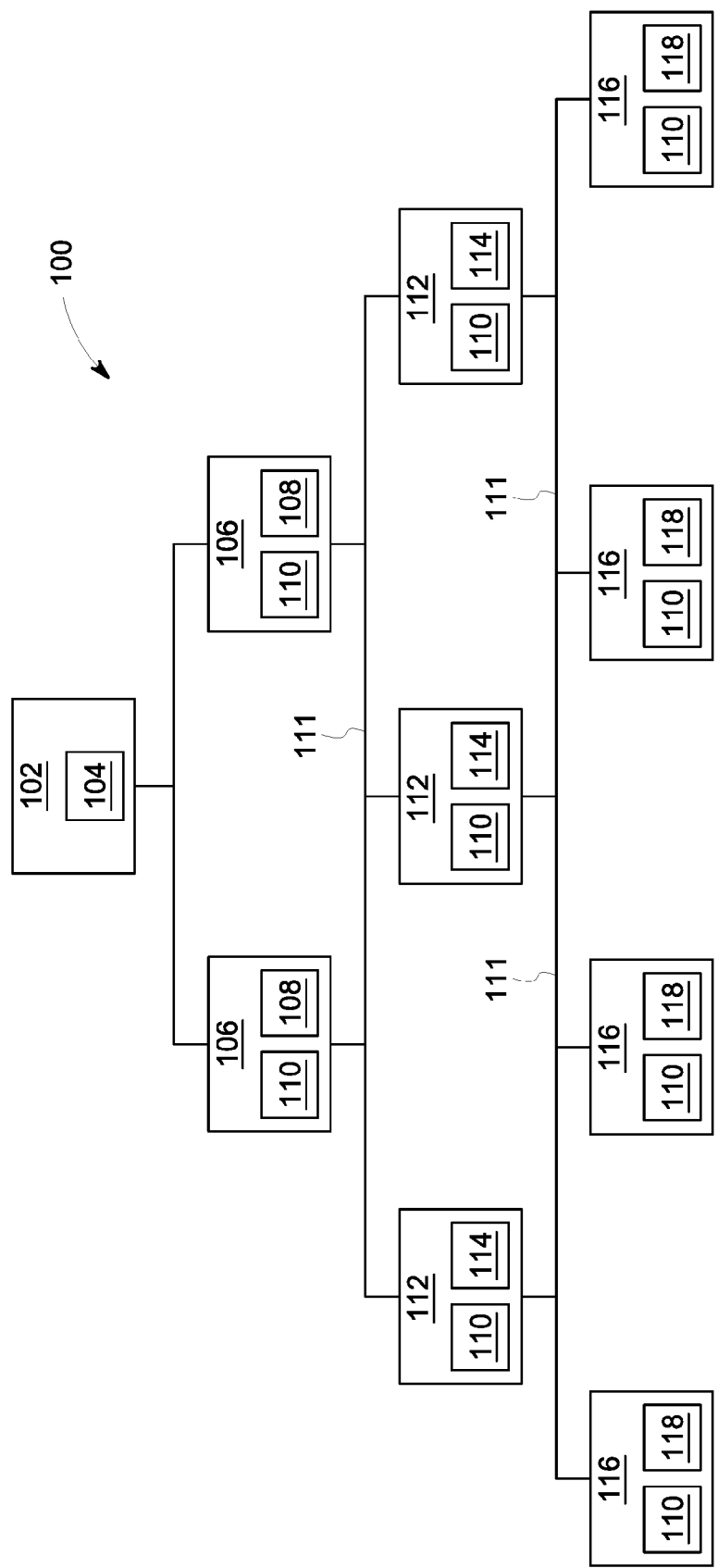
FIG. 1 is a schematic view of an exemplary utility distribution system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), a programmable logic unit (PLU), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The method and systems described herein provide for detecting false data injection attacks on a power grid. Furthermore, the method and systems described herein facilitate more accurate monitoring of sensors to rapidly respond to issues. These methods and systems facilitate regulating and monitoring sensors of a utility distribution system to accurately operate the utility distribution system and protect against potential cyber-attacks. Also, the system and methods described herein are not limited to any single type of system or type of sensor, but may be implemented with any system with sensors that are configured as described herein. For example, the method and systems described herein may be used with any other system where the sensors provide analog data that may be falsified. By constantly monitoring the output of the sensors in a variety of attributes and comparing the output to normal operation of the system, the system and method described herein facilitates more efficient operation of systems while facilitating detecting potential cyber-attacks.

FIG. 1 is a schematic view of an exemplary utility distribution system 100. While in the exemplary embodiment, utility distribution system 100 is directed to the generation and delivery of electrical energy, other utility based resources, such as, but not limited to, gas and water, may be used with the system and methods described herein. In the exemplary embodiment, utility distribution system 100 is configured as a smart grid system.

In the exemplary embodiment, utility distribution system 100 includes a utility 102 that includes one or more utility computer devices 104. Utility computer devices 104 control the proper delivery and distribution of the associated utility resource. Utility distribution system 100 also includes one or more power generation systems 106. Examples of power generation systems 106 include, but are not limited to, wind turbines, geothermal pumps, solar plants, nuclear plants, coal and/or gas powered turbine plants, and hydroelectric plants. In the exemplary embodiment, power generation systems 106 are regulated by power generation computer devices 108. Power generation systems 106 also include one or more components 110 used in the generation and transmission of electrical energy.

In the exemplary embodiment, power generation system 106 transmits electrical power through a grid 111. Grid 111 includes a plurality of conduits that allow the electrical energy to be routed to its destination. In the exemplary embodiment, grid 111 also includes a communication network that allows the computer devices, such as utility computer device 104 and power generation computer device 108 to communicate.

Utility distribution system 100 also includes a plurality of substations 112. These substations 112 regulate the electrical energy as it is transmitted through grid 111. In the exemplary embodiment, substations 112 each include one or more substation computer devices 114 that regulate the operation of the corresponding substation 112. Substations 112 each also include one or more components 110 used in the transmission of electrical energy. Examples of components include, but are not limited to, a substation load tap changer, a substation voltage regulator, a line voltage regulator, a capacitor bank, a single-phase transformer, a multi-phase transformer, phasor measurement unit (PMU), and a customer meter.

Utility distribution system 100 further includes a plurality of loads 116. Examples of loads 116 include businesses and residences that consume electrical energy. Loads 116 also include one or more components 110 used in the delivery of electrical energy to load 116. In the exemplary embodiment, utility distribution system 100 is configured to distribution electrical energy from one or more power generation systems 106 to a plurality of loads 116. In some embodiments, load 116 includes a load computer device 118 that regulates load 116.

Figure 2:
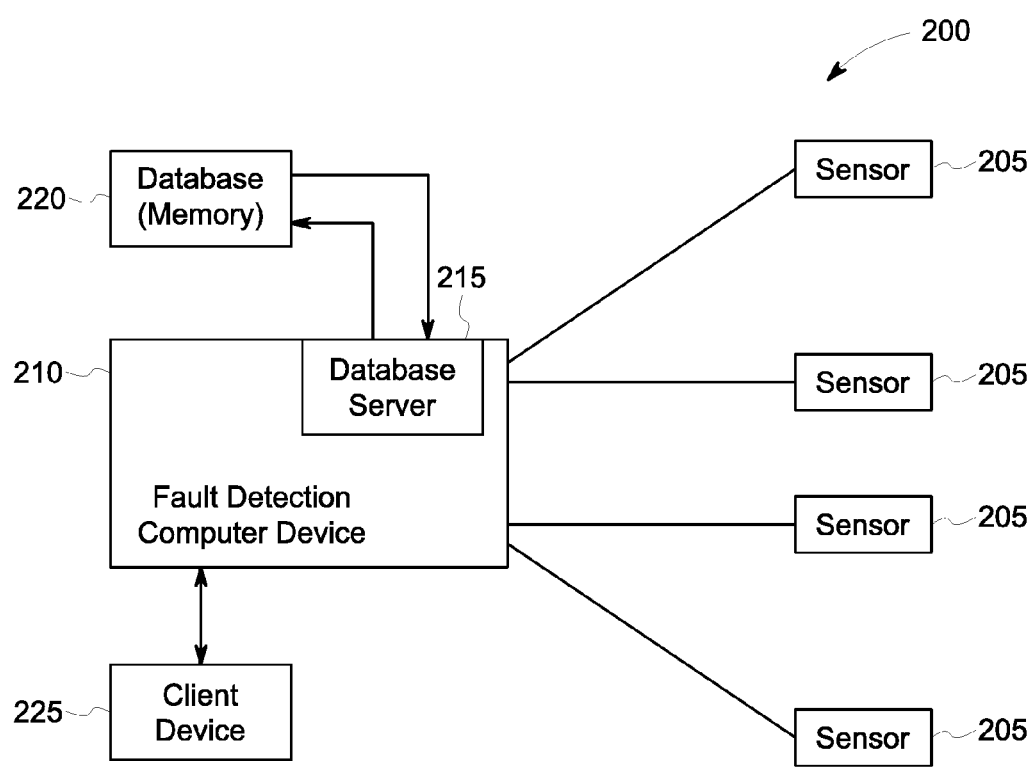
FIG. 2 is a schematic view of a system for detecting false data injection attacks in the utility distribution system shown in FIG. 1.

FIG. 2 is a schematic view of a system 200 for detecting false data injection attacks in utility distribution system 100 (shown in FIG. 1). In the exemplary embodiment, system 200 is used for monitoring the transmission of electrical energy over utility distribution system 100, detecting faults in utility distribution system 100, and responding to those faults. As described below in more detail, a fault detection computer device 210 may be configured to (a) receive signals representing measurement data from the one or more sensors 205 that each monitor a component 110 (shown in FIG. 1) and generate signals representing measurement data, (b) receive a fault indication of a fault at a component 110, (c) generate a profile for the corresponding component 110 based on the measurement data, and (d) determine an accuracy of the fault indication based upon the generated profile.

Sensors 205 are in communication with fault detection computer device 210. Sensors 205 couple to fault detection computer device 210 through interfaces including, without limitation, a network, such as a local area network (LAN) or a wide area network (WAN), dial-in-connections, cable modems, Internet connection, wireless, and special high-speed Integrated Services Digital Network (ISDN) lines. In some embodiments, sensors 205 are in communication with fault detection computer device 210 through grid 111 (shown in FIG. 1). Sensors 205 receive data about utility distribution system 100 operating conditions and report those conditions to fault detection computer device 210. In the exemplary embodiment, sensors 205 measure voltage, amperage, and phase of transmitted energy. In the exemplary embodiment, system 100 includes a plurality of components 110 to transmit and distribute energy. At least a subset of these components 110 is monitored by sensors to assist in the proper operation of system 100. System 200 may include more or less sensors 205 as needed to enable system 200 to function as described herein.

In the exemplary embodiment, fault detection computer device 210 is one of utility computer device 104, power generation computer device 108, substation computer device 114, and load computer device 118 (all shown in FIG. 1). In some embodiments, fault detection computer device 210 is just in communication with at least one of utility computer device 104, power generation computer device 108, substation computer device 114, and load computer device 118. Fault detection computer device 210 is capable of communicating through interfaces including, without limitation, grid 111, a network, such as a local area network (LAN) or a wide area network (WAN), dial-in-connections, cable modems, Internet connection, wireless, and special high-speed Integrated Services Digital Network (ISDN) lines.

A database server 215 is coupled to database 220, which contains information on a variety of matters, as described below in greater detail. In one embodiment, centralized database 220 is stored on fault detection computer device 210. In an alternative embodiment, database 220 is stored remotely from fault detection computer device 210 and may be non-centralized. In some embodiments, database 220 includes a single database having separated sections or partitions or in other embodiments, database 220 includes multiple databases, each being separate from each other. Database 220 stores measurement data received from multiple sensors 205. In addition, and without limitation, database 220 stores fault profiles, component data, component specifications, equations, and historical data generated as part of collecting measurement data from multiple sensors 205.

In some embodiments, fault detection computer device 210 is in communication with a client device 225, also known as a client system 225. Fault detection computer device 210 couples to client device 225 through many interfaces including, without limitation, grid 111, a network, such as a local area network (LAN) or a wide area network (WAN), dial-in-connections, cable modems, Internet connection, wireless, and special high-speed Integrated Services Digital Network (ISDN) lines. In these embodiments, fault detection computer device 210 transmits data about the operation of components to client device 225. This data includes, without limitation, data from sensors 205, real-time measurements, potential sensor errors, and potential cyber-attacks, and other operational data that client device 225 is configured to monitor. Furthermore, fault detection computer device 210 is configured to receive additional instructions from client device 225. Additionally, client device 225 is configured to access or update database 220 through fault detection computer device 210. Client device 225 is configured to present the data from fault detection computer device 210 to a user. In other embodiments, fault detection computer device 210 includes a display unit (not shown) to display data directly to a user.

Figure 3:
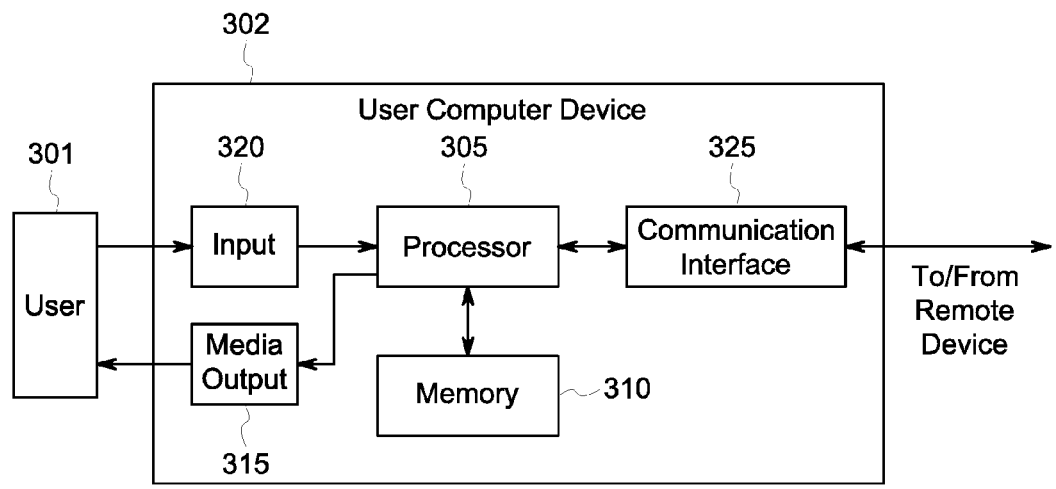
FIG. 3 is a schematic view of an exemplary configuration of a client device that may be used with the system shown in FIG. 2.

FIG. 3 illustrates an exemplary configuration of client system 225 shown in FIG. 2. A user computer device 302 is operated by a user 301. User computer device 302 may include, but is not limited to, client systems 225 (shown in FIG. 2) and load computer device 118 (shown in FIG. 1). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 includes one or more computer-readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, a dashboard for monitoring sensor measurements, a control screen for controlling operation of user computer device 302, and/or an update screen for updating software in user computer device 302. In some embodiments, user computer device 302 includes an input device 320 for receiving input from user 301. User 301 may use input device 320 to, without limitation, select and/or enter one or more sensor measurements to view. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as fault detection computer device 210 (shown in FIG. 2). Communication interface 325 may include, for example, a wired or wireless network adapter and/or a wireless data transceiver for use with a mobile telecommunications network.

Stored in memory area 310 are, for example, computer-readable instructions for providing a user interface to user 301 via media output component 315 and, optionally, receiving and processing input from input device 320. The user interface may include, among other possibilities, a web browser and/or a client application. Web browsers enable users, such as user 301, to display and interact with media and other information typically embedded on a web page or a website from fault detection computer device 210. A client application allows user 301 to interact with, for example, fault detection computer device 210. For example, instructions may be stored by a cloud service and the output of the execution of the instructions sent to the media output component 315.

Figure 4:
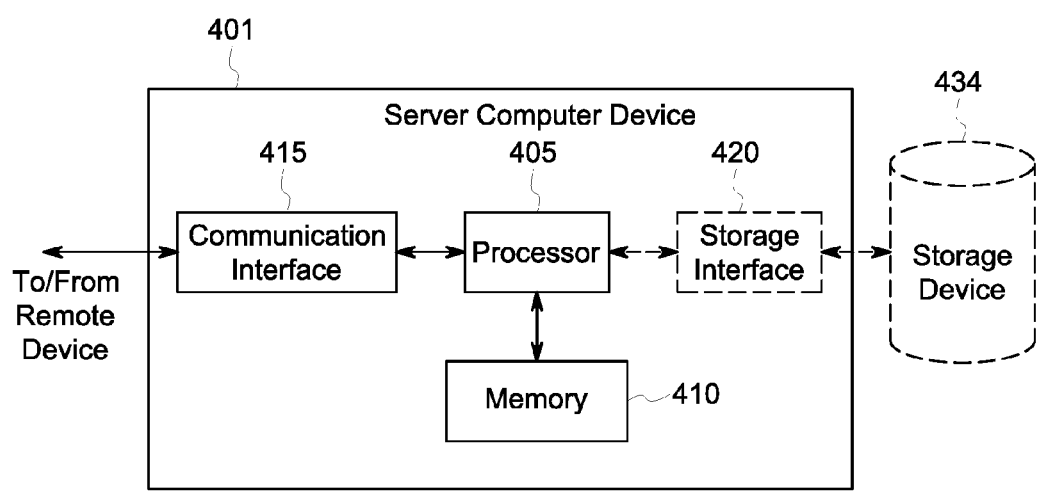
FIG. 4 is a schematic view of an exemplary configuration of a fault detection computer device that may be used with the system shown in FIG. 2.

FIG. 4 illustrates an example configuration of fault detection computer device 210 shown in FIG. 2, in accordance with one embodiment of the present disclosure. Server computer device 401 may include, but is not limited to, database server 215, fault detection computer device 210 (both shown in FIG. 2), utility computer device 104, power generation computer device 108, and substation computer device 114 (all three shown in FIG. 1). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, client systems 225, sensors 205, utility computer device 104, power generation computer device 108, substation computer device 114, and load computer device 118 (shown in FIG. 1). For example, communication interface 415 may receive requests from client systems 225 via the Internet.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Figure 7:
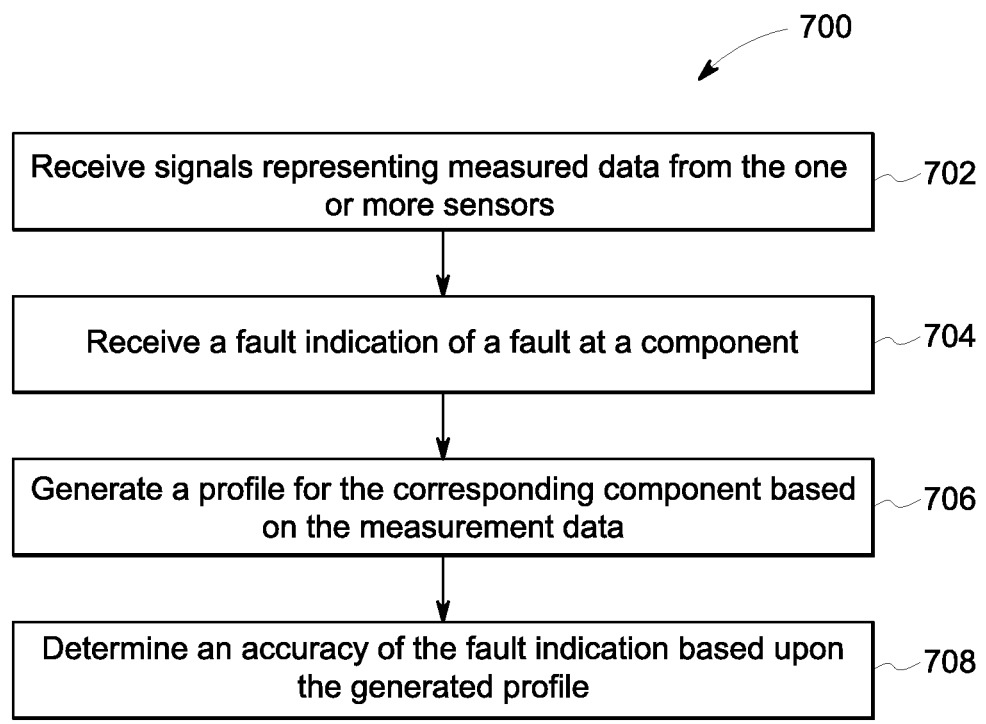
FIG. 7 is a flow chart of a process for detecting false data injection attacks in the utility distribution system shown in FIG. 1 using the system shown in FIG. 2.

Processor 405 executes computer-executable instructions for implementing aspects of the disclosure. In some embodiments, processor 405 is transformed into a special purpose microprocessor by executing computer-executable instructions or by otherwise being programmed. For example, processor 405 is programmed with the instructions such as are illustrated in FIG. 7.

Figure 5:
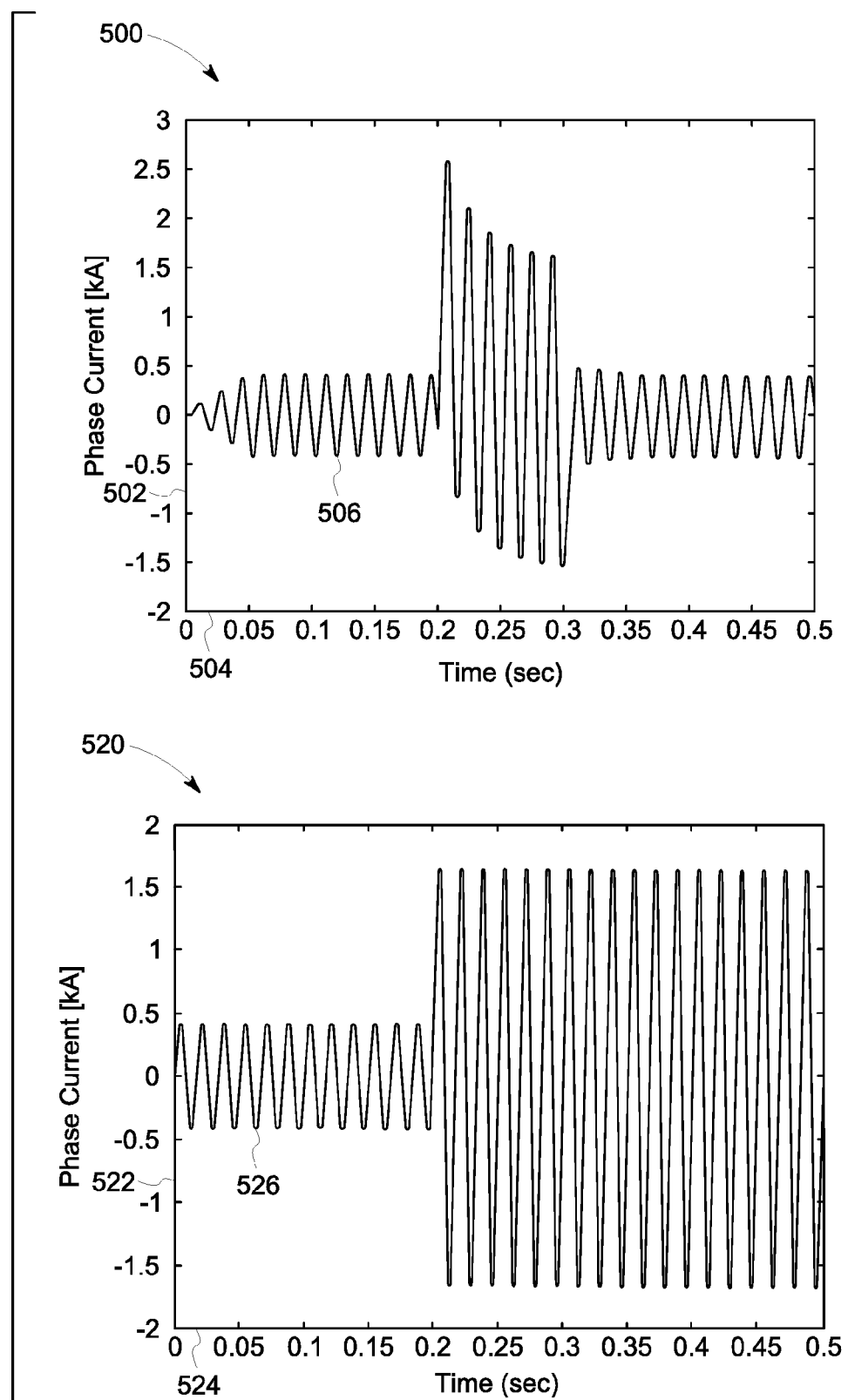
FIG. 5 is an illustration of an exemplary scenario of a fault using real and spoofed data.

FIG. 5 is an illustration of an exemplary scenario of a fault using real and spoofed data. FIG. 5 is a graphical view of the phase current of a component 110 of utility distribution system 100 (both shown in FIG. 1) over a period of time during a fault scenario. Graph 500 illustrates the sinusoidal nature of the power at component 110. FIG. 5 includes a normal output graph 500 of an actual fault that includes a y-axis 502 defining a phase current in kiloamps (kA). Graph 500 also includes an x-axis 504 defining time in seconds. Graph 500 further includes a phase current versus time curve 506. In graph 500, the fault occurs at time 0.2 seconds and sinusoidal curve 506 rises to 2.5 kA and then lowers to pre-fault levels after time 0.35 seconds. Graph 500 illustrates the changes in the phase current over time curve 506 when a fault actually occurs.

FIG. 5 also includes a normal output graph 520 of a spoofed fault that includes a y-axis 522 defining a phase current in kiloamps (kA). Graph 520 also includes an x-axis 524 defining time in seconds. Graph 520 further includes a phase current versus time curve 526. In graph 520, the fault occurs at time 0.2 seconds. The phase current shown in curve 526 increases from ±0.4 kA to ±1.7 kA at time 0.2 seconds and stays at that level.

In the exemplary embodiment, spoofed data is falsified data that simulates real measurement data from an actual sensor 205. For example, spoofed data may be introduced by a hacker or other attacker that intercepts and replaces the actual sensor data. In graph 520, curve 526 illustrates spoofed data that is falsified and presented as accurate data from sensor 205. Spoofed data may be introduced into utility distribution system 100 (shown in FIG. 1), in a plurality of methods such as, but not limited to, hacking or compromising one or more sensors 205, utility computer devices 104, power generation computer devices 108, substation computer devices 114, load computer devices 118, and grid 111 (all shown in FIG. 1).

The comparison of graph 500 and graph 520 illustrates a potential method that spoofed data may be detected. While the measurement data from sensor 205 (shown in FIG. 2) may be manipulated to indicate a fault, sensor 205 includes multiple types of data. In the exemplary embodiment, the voltage data is manipulated to exceed a threshold that indicates a fault. However, graph 520 indicates that the phase data does not match how an actual fault should look. In this embodiment, the spoofed phase current curve 526 does not behave like a real phase current curve 506 when viewed over time. In the exemplary embodiment, real phase current data would show changes in phase current curve 506 after the fault, but the spoofed phase current curve 526 only shows consistent values.

Figure 6:
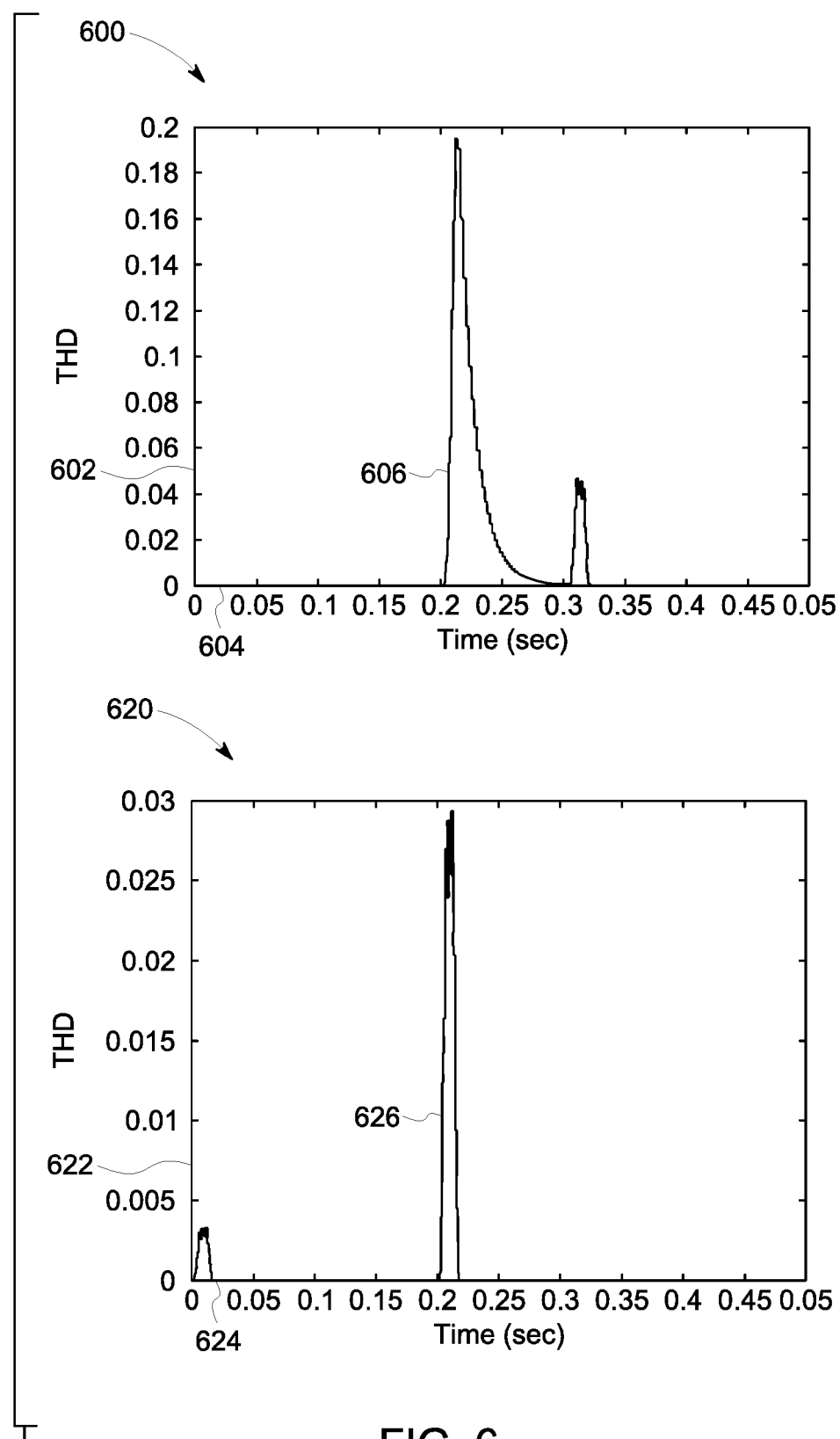
FIG. 6 is another illustration of the exemplary scenario of a fault using real and spoofed data shown in FIG. 6.

FIG. 6 is another illustration of the exemplary scenario of a fault using real and spoofed data shown in FIG. 5. FIG. 6 is a graphical view of the phase current of a component 110 of utility distribution system 100 (both shown in FIG. 1) over a period of time during a fault scenario. FIG. 6 includes a normal output graph 600 of an actual fault that includes a y-axis 602 defining total harmonic distortion (THD). Graph 600 also includes an x-axis 604 defining time in seconds. Graph 500 further includes a THD versus time curve 606. Curve 606 illustrates the THD of the phase current versus time curve 506 (shown in FIG. 5). In graph 600, the fault occurs at time 0.2 seconds. The THD has a spike up at the moment of the fault, which then settles down over a period of time. Curve 606 also shows a spike after time 0.3 seconds. Graph 600 illustrates the changes in the THD over time curve 606 when a fault actually occurs.

FIG. 6 also includes a normal output graph 620 of a spoofed fault that includes a y-axis 622 defining THD. Graph 620 also includes an x-axis 624 defining time in seconds. Graph 620 further includes a THD versus time curve 626. In graph 620, the fault occurs at time 0.2 seconds. The THD has a spike of activity that returns to 0 almost immediately. This shows that the spoofed signals showed only the immediate change in phase current, but not proper change over time as would be shown in an actual system, such as that shown in curve 606.

FIG. 7 is a flow chart of a process 700 for detecting false data injection attacks in utility distribution system 100 (shown in FIG. 1) using system 200 (shown in FIG. 2). In the exemplary embodiment, process 700 is performed by fault detection computer device 210 (shown in FIG. 2). Process 700 is a real-time process.

In the exemplary embodiment, fault detection computer device 210 receives 702 signals representing measurement data from one or more sensors 205 (shown in FIG. 2). As described above, sensors 205 provide information about current conditions of utility distribution system 100. In some embodiments, measurement data includes the voltage, current, and phase at a component 110 (shown in FIG. 1). In other embodiments, measurement data includes any data that allows system 200 to operate as described herein.

Fault detection computer device 210 receives 704 a fault indication of a fault associated with component 110. In some embodiments, the fault indication is a signal from component 110 that a fault has occurred. In other embodiments, the fault indication is based on measurement data. In still other embodiments, the fault indication is received 704 from a computer device, such as utility computer device 104, power generation computer device 108, substation computer device 114, and load computer device 118.

Fault detection computer device 210 generates 706 a profile for the component 110 based on the measurement data. For example, fault detection computer device 210 may generate 706 a profile similar to that shown in graph 500 (shown in FIG. 5), when component 110 has an actual fault and corresponding sensor 205 is transmitting accurate data. Otherwise, fault detection computer device 210 may generate 706 a profile similar to that shown in graph 520 (shown in FIG. 5). In other embodiments, profile may also include graphs 600 or 620 (shown in FIG. 6).

Fault detection computer device 210 determines 708 an accuracy of the fault indication based upon the generated profile. In some embodiments, the accuracy of the fault indication is a Boolean value that indicates that there is a problem with the generated profile. In other embodiments, the accuracy is a percentage, a weighted scale, or other value that indicates a probability that the fault indication is accurate based on the generated profile.

In the exemplary embodiment, fault detection computer device 210 stores a plurality of fault profiles, such as graphs 500 and 600. In this embodiment, fault detection computer device 210 compares the stored plurality of fault profiles to the generated profile and determines 708 the accuracy based on that comparison. In some embodiments, fault detection computer device 210 stores fault profiles for potential cyber-attacks, such as graphs 520 and 620. In some further embodiments, database 220 (shown in FIG. 2) is updated with profiles of known cyber-attacks to compare to generated profile. In the exemplary embodiment, fault detection computer device 210 compares the noise in the stored plurality of fault profiles to the noise of the generated profiles for each sensor 205. If the noise in one or more of the generated profiles does not match an actual noise profile from one of the store profiles, then fault detection computer device 210 may determine that there is an error with the profile generated from the sensor data.

In some embodiments, fault detection computer device 210 receives 702 measurement data from multiple sensors 205 at different distances from component 110. In these embodiments, fault detection computer device 210 generates 706 profiles for each sensor 205. Fault detection computer device 210 compares the generated profiles to each other.

In some embodiments, when the data from one sensor is being spoofed, fault detection computer device 210 may determine that the data from a first sensor 205 is being spoofed by comparing it to the data from other nearby sensors 205. For example, a fault is shown at a first sensor 205 that is associated with component 110, but there is no indication of the fault at a nearby sensor 205. In these embodiments, an actual fault is detected by multiple sensors. Each of these sensors 205 provides different measurement data based on the distance between the sensor 205 and component 110. In these embodiments, fault detection computer device 210 compares the fault profiles from each sensor to determine if the measurement data is accurate based on the distance between sensor 205 and component 110 and on the distance between each different sensor 205. For example, a fault may appear as a large spike on a graph associated with a first sensor 205 that is proximate to component 110, and appear as a much smaller spike on a graph associated with a second sensor 205.

In the example embodiments, fault detection computer device 210 generates 706 a profile based on measure data before the fault occurred and data after the fault occurred. By looking over a period of time at the THD of the signal from sensor 205, fault detection computer device 210 is able to more accurately determine the authenticity of the data from sensor 205.

In some embodiments, fault detection computer device 210 is able to determine that a potential cyber-attack is occurring based on the determined accuracy and the generated profile. In some embodiments, fault detection computer device 210 disables component 110 based on the determined authenticity of the data from sensor 205. In other embodiments, fault detection computer device 210 disables one or more sensors 205 or removes the data from one or more sensors 205. For example, where fault detection computer device 210 determined that the input from the one or more sensors 205 is incorrect, such as if the data had been spoofed by a cyber-attack. In still further embodiments, fault detection computer device 210 raises one or more alarms that component 110 or system 100 (shown in FIG. 1) is under a potential cyber-attack. In still further embodiments, fault detection computer device 210 is in communication with one or more cybersecurity computer systems (not shown) that are configured to act in response to a cyberattack. These cybersecurity computer systems may monitor the cyberattack and/or respond to the cyberattack.

In some embodiments, fault detection computer device 210 determines that sensor 205 is in error based on the generated profile. For example, sensor 205 may be broken or misconfigured and require maintenance. In these embodiments, fault detection computer device 210 may transmit a maintenance request for sensor 205. In some further embodiments, fault detection computer device 210 may use other nearby sensors 205 instead of the failing sensor 205 when viewing data about component 110.

Figure 8:
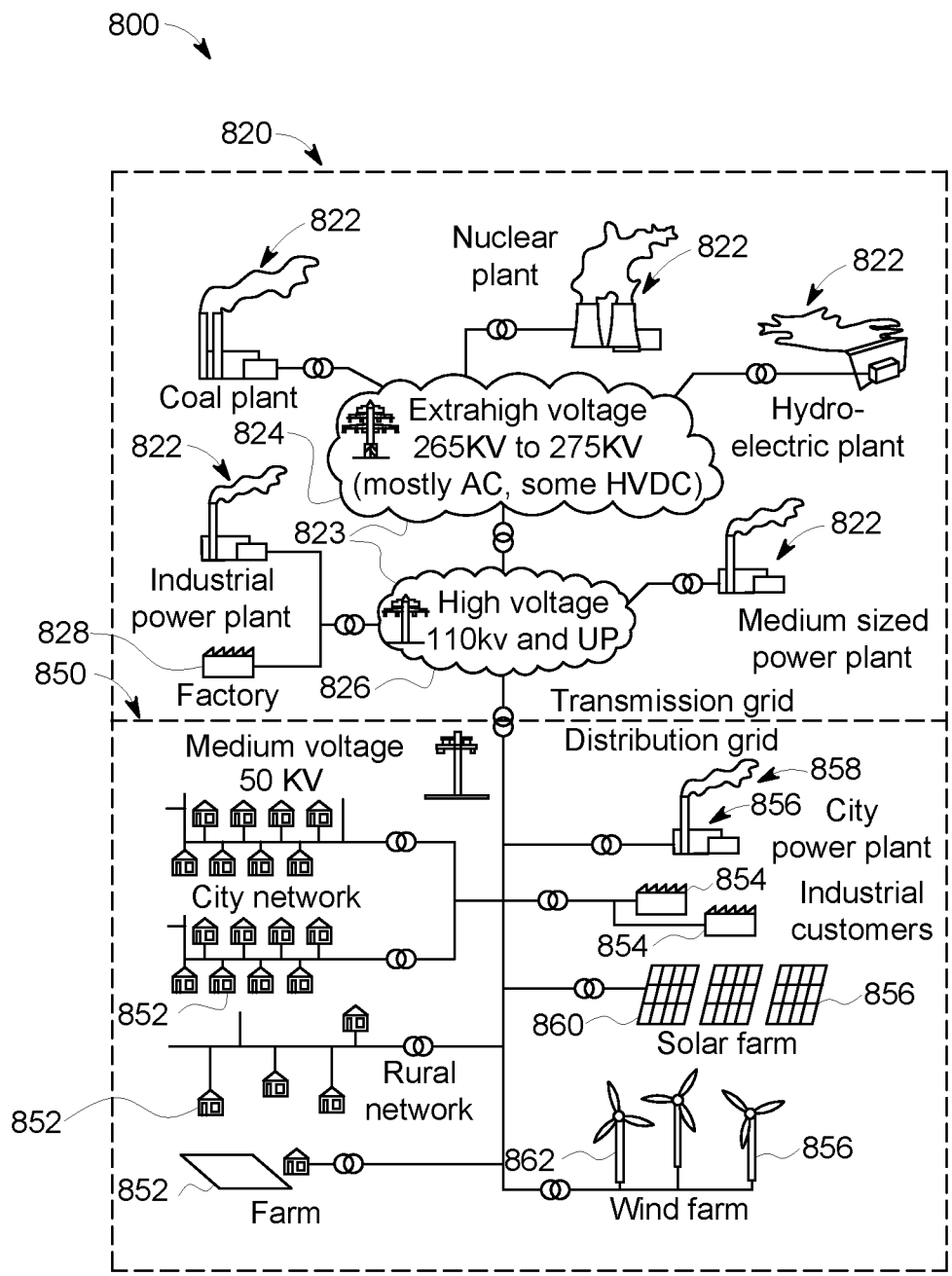
FIG. 8 is a general schematic diagram of an exemplary electric power network including both an exemplary transmission network and an exemplary electric power distribution system with distributed generation (DG).

FIG. 8 is a general schematic diagram of an exemplary electric power network 800. In general, electric power network 800 typically includes a generation and transmission portion 820 coupled to an exemplary electric power distribution system 850. Generation and transmission portion 820 includes a plurality of power plants 822 generating and transmitting electric power to a transmission grid 823, which includes an extra high voltage transmission grid 824 and a high voltage transmission grid 826 through which power is transmitted to electric power distribution system 850. In the exemplary embodiment, extra high voltage transmission grid 824 includes voltages greater than approximately 265 kiloVolts (kV) and high voltage transmission grid 826 includes voltages between approximately 110 kV and approximately 265 kV. Alternatively, extra high voltage transmission grid 824 and high voltage transmission grid 826 have any voltages that enable operation of electric power distribution system 850 as described herein. Some electric power customers, such as power-intensive industrial facilities, e.g., and without limitation, factory 828, are coupled to high voltage transmission grid 826. Electric power network 800 may include, without limitation, any number, type and configuration of power plants 822, extra high voltage transmission grids 824, high voltage transmission grids 826, factories 828, and electric power distribution systems 850.

Also, in the exemplary embodiment, electric power distribution system 850 includes low wattage consumers 852 and industrial medium wattage consumers 854. Electric power distribution system 850 also includes distributed generation (DG) 856. Such DG 856 includes, without limitation, a city power plant 858, a solar farm 860, and a wind farm 862. While electric power distribution system 850 is shown with an exemplary number and type of distributed generators 856, electric power distribution system 850 may include any number and type of distributed generators 856, including, without limitation, individual diesel generators, micro-turbines, solar collector arrays, solar photovoltaic (PV) arrays, and wind turbines.

The above-described method and system provide for detecting false data injection attacks on a power grid. Furthermore, the method and systems described herein facilitate more accurate monitoring of sensors to rapidly respond to issues. These methods and systems facilitate regulating and monitoring sensors of a utility distribution system to accurately operate the utility distribution system and protect against potential cyber-attacks. Also, the system and methods described herein are not limited to any single type of system or type of sensor, but may be implemented with any system with sensors that are configured as described herein. For example, the method and systems described herein may be used with any other system where the sensors provide analog data that may be falsified. By constantly monitoring the output of the sensors in a variety of attributes and comparing the output to normal operation of the system, the system and method described herein facilitates more efficient operation of systems while facilitating detecting potential cyber-attacks.

An exemplary technical effect of the methods, systems, and apparatus described herein includes at least one of: (a) detecting potential cyber-attacks on the system; (b) overcoming maliciously injected spoofed data; (c) rapidly determining the accuracy of sensors; and (d) facilitating reliable operation of a utility distribution system.

Exemplary embodiments of method and systems for detecting data injection attacks are described above in detail. The method and systems described herein are not limited to the specific embodiments described herein, but rather, components of systems or steps of the methods may be utilized independently and separately from other components or steps described herein. For example, the methods may also be used in combination with different types of sensors associated with multiple different types of systems, and are not limited to practice with only the utility distribution systems as described herein. Rather, the exemplary embodiments may be implemented and utilized in connection with many other systems, that may be vulnerable to false data injection attacks, be operated as described herein. In some other embodiments, the methods and systems described herein may be used with video monitoring systems, alarm systems, or any other type of monitoring system.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for detecting false data injection attacks, said system comprising:
one or more sensors configured to monitor a component and generate signals representing measurement data associated with the component, wherein said one or more sensors comprise a first sensor and a second sensor: and
a fault detection computer device comprising a processor and a memory coupled to said processor, said fault detection computer device in communication with said one or more sensors, said fault detection computer device configured to:
receive the signals representing measurement data from the one or more sensors; receive signals from said first sensor and said second sensor, wherein said first sensor is proximate to the component and said second sensor is a distance from said first sensor: receive a fault indication of a fault associated with the component; generate a component profile for the component based on the measurement data; determine a first profile based on the signals from said first sensor: determine a second profile based on the signals from said second sensor; compare the first profile to the second profile based on the distance between said first sensor and said second sensor; and determine an accuracy of the fault indication based upon the generated component profile and the comparison.

2. The system in accordance with claim 1, wherein said fault detection computer device is further configured to:
store a plurality of profiles corresponding to a plurality of faults; and
compare the generated component profile with the stored plurality of profiles;
wherein the determination of the accuracy of the fault indication is further based on the comparison of the generated component profile with the stored plurality of profiles.

3. The system in accordance with claim 2, wherein said fault detection computer device is further configured to determine at least one potential sensor error based on the comparison of the generated component profile with the stored plurality of profiles.

4. The system in accordance with claim 3, wherein said fault detection computer device is further configured to issue a maintenance request based on the at least one potential sensor error.

5. The system in accordance with claim 1, wherein the generated component profile includes a total harmonic distortion of the signals of said one or more sensors.

6. The system in accordance with claim 1, wherein the generated component profile includes a total harmonic distortion of the signals of said one or more sensors over a period of time prior to the fault and a period of time after the fault.

7. The system in accordance with claim 1, wherein said fault detection computer device is further configured to determine a potential cyber-attack based on the accuracy of the fault indication.

8. The system in accordance with claim 1, wherein the component is at least one of a substation load tap changer, a substation voltage regulator, a line voltage regulator, a capacitor bank, a single-phase transformer, a multi-phase transformer, and a customer meter.

9. The system in accordance with claim 1, wherein said fault detection computer device is further configured to disable the component based at least in part on the accuracy of the fault indication.

10. The system in accordance with claim 1, wherein said fault detection computer device is further configured to at least one of disable and ignore an output from at least one of the sensors of the one or more sensors based at least in part on the accuracy of the fault indication.

11. A computer-based method for detecting false data injection attacks, said method implemented using a fault detection computer device including at least one processor in communication with a memory, said method comprising:
receiving signals representing measurement data from the one or more sensors that monitor a component and generate signals representing the measurement data associated with the component;
receiving signals from a first sensor and a second sensor of the one or more sensors, wherein the
first sensor is proximate to the component and the second sensor is a distance from the first sensor; receiving a fault indication of a fault associated with the component; generating a component profile for the component based on the measurement data; determining a first profile based on the signals from the first sensor; determining a second profile based on the signals from the second sensor; comparing the first profile to the second profile based on the distance between the first sensor and the second sensor; and determining an accuracy of the fault indication based upon the generated component profile and the comparing.

12. The method in accordance with claim 11, further comprising:
storing a plurality of profiles corresponding to a plurality of faults; and
comparing the generated component profile with the stored plurality of profiles;
wherein the determining the accuracy of the fault indication is further based on the comparison of the generated component profile with the stored plurality of profiles.

13. The method in accordance with claim 12, further comprising determining at least one potential sensor error based on the comparison of the generated component profile with the stored plurality of profiles.

14. The method in accordance with claim 11, wherein the generated component profile includes a total harmonic distortion of the signals of the one or more sensors.

15. The method in accordance with claim 11, wherein the generated component profile includes a total harmonic distortion of the signals of the one or more sensors over a period of time prior to and a period of time after the fault.

16. The method in accordance with claim 11, further comprising determining a potential cyber-attack based on the accuracy of the fault indication.

17. A computer-readable storage device having processor-executable instructions embodied thereon, for detecting false data injection attacks, wherein when executed by a fault detection computer device communicatively coupled to a memory, the processor-executable instructions cause the fault detection computer device to:
receive signals representing measurement data from the one or more sensors that monitor a component and generate signals representing the measurement data associated with the component;
receive signals from a first sensor and a second sensor of the one or more sensors, wherein the first sensor is proximate to the component and the second sensor is a distance from the first sensor: receive a fault indication of a fault associated with the component; generate a component profile for the component based on the measurement data; determine a first profile based on the signals from the first sensor: determine a second profile based on the signals from the second sensor; compare the first profile to the second profile based on the distance between said first sensor and said second sensor; and determine an accuracy of the fault indication based upon the generated component profile and the comparison.

18. The computer readable storage device of claim 17, wherein the processor-executable instructions cause the fault detection computer device to:
 store a plurality of profiles corresponding to a plurality of faults;
 compare the generated component profile with the stored plurality of profiles; and
 wherein the determination of the accuracy of the fault indication is further based on the comparison.

* * * * *